United States Patent
Okuno et al.

(10) Patent No.: US 10,136,005 B2
(45) Date of Patent: Nov. 20, 2018

(54) IMAGE PROCESSING APPARATUS AND IMAGE PROCESSING SYSTEM CAPABLE OF GENERATING SCAN DATA AND METADATA

(71) Applicant: BROTHER KOGYO KABUSHIKI KAISHA, Nagoya-shi, Aichi-ken (JP)

(72) Inventors: Tetsuya Okuno, Nagoya (JP); Toyoshi Adachi, Kakamigahara (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 3 days.

(21) Appl. No.: 15/467,024

(22) Filed: Mar. 23, 2017

(65) Prior Publication Data

US 2017/0366687 A1    Dec. 21, 2017

(30) Foreign Application Priority Data

Jun. 20, 2016    (JP) ................. 2016-121515

(51) Int. Cl.
| | |
|---|---|
| H04N 1/00 | (2006.01) |
| H04N 1/23 | (2006.01) |
| G06F 3/12 | (2006.01) |

(52) U.S. Cl.
CPC ....... *H04N 1/00225* (2013.01); *G06F 3/1203* (2013.01); *G06F 3/1236* (2013.01);
(Continued)

(58) Field of Classification Search
CPC ........... H04N 1/00225; H04N 1/00018; H04N 1/00244; H04N 2201/0094;
(Continued)

(56) References Cited

U.S. PATENT DOCUMENTS

| | | | |
|---|---|---|---|
| 2009/0195807 A1 | 8/2009 | Soneoka et al. | |
| 2012/0113468 A1* | 5/2012 | Urakawa | G06F 9/4445 358/1.15 |

(Continued)

FOREIGN PATENT DOCUMENTS

JP    2009-188711 A    8/2009

*Primary Examiner* — Benny Q Tieu
*Assistant Examiner* — Juan M Guillermety
(74) *Attorney, Agent, or Firm* — Scully, Scott, Murphy & Presser, PC

(57) ABSTRACT

An image processing apparatus includes: a scanner, memory storing instructions; and a controller, when executing the instructions, causing the image processing apparatus to execute: a first reception processing of receiving instruction data, a first determination processing of determining whether the instruction data is screen instruction data or action instruction data. If the instruction data is the screen instruction data, the image processing apparatus executes: a display processing of displaying a setting screen, an acceptance processing of accepting a user operation designating the parameter; a first storage processing of storing the parameter designated by the acceptance processing. If the instruction data is the action instruction data, the image processing apparatus executes: a scan instruction processing of causing the scanner to execute the scanning action; a generation processing of generating the metadata, with using the parameter stored in the memory, and a second transmission processing.

14 Claims, 9 Drawing Sheets

(52) U.S. Cl.
CPC ....... *G06F 3/1286* (2013.01); *H04N 1/00018* (2013.01); *H04N 1/00244* (2013.01); *H04N 2201/0094* (2013.01)

(58) Field of Classification Search
CPC ........... H04N 1/00408; H04N 1/00411; H04N 1/00413; G06F 3/1203; G06F 3/1236; G06F 3/1286; G06F 3/1246; G06F 3/1288; G06F 17/30911; G06F 17/30923; G05B 2219/3212; H03M 7/707
See application file for complete search history.

(56) References Cited

U.S. PATENT DOCUMENTS

| | | | | |
|---|---|---|---|---|
| 2013/0003100 | A1* | 1/2013 | Miyazawa | H04N 1/00244 358/1.13 |
| 2014/0254795 | A1* | 9/2014 | Selvaraj | H04N 1/00244 380/246 |
| 2015/0116745 | A1* | 4/2015 | Niimura | H04N 1/00411 358/1.13 |

* cited by examiner

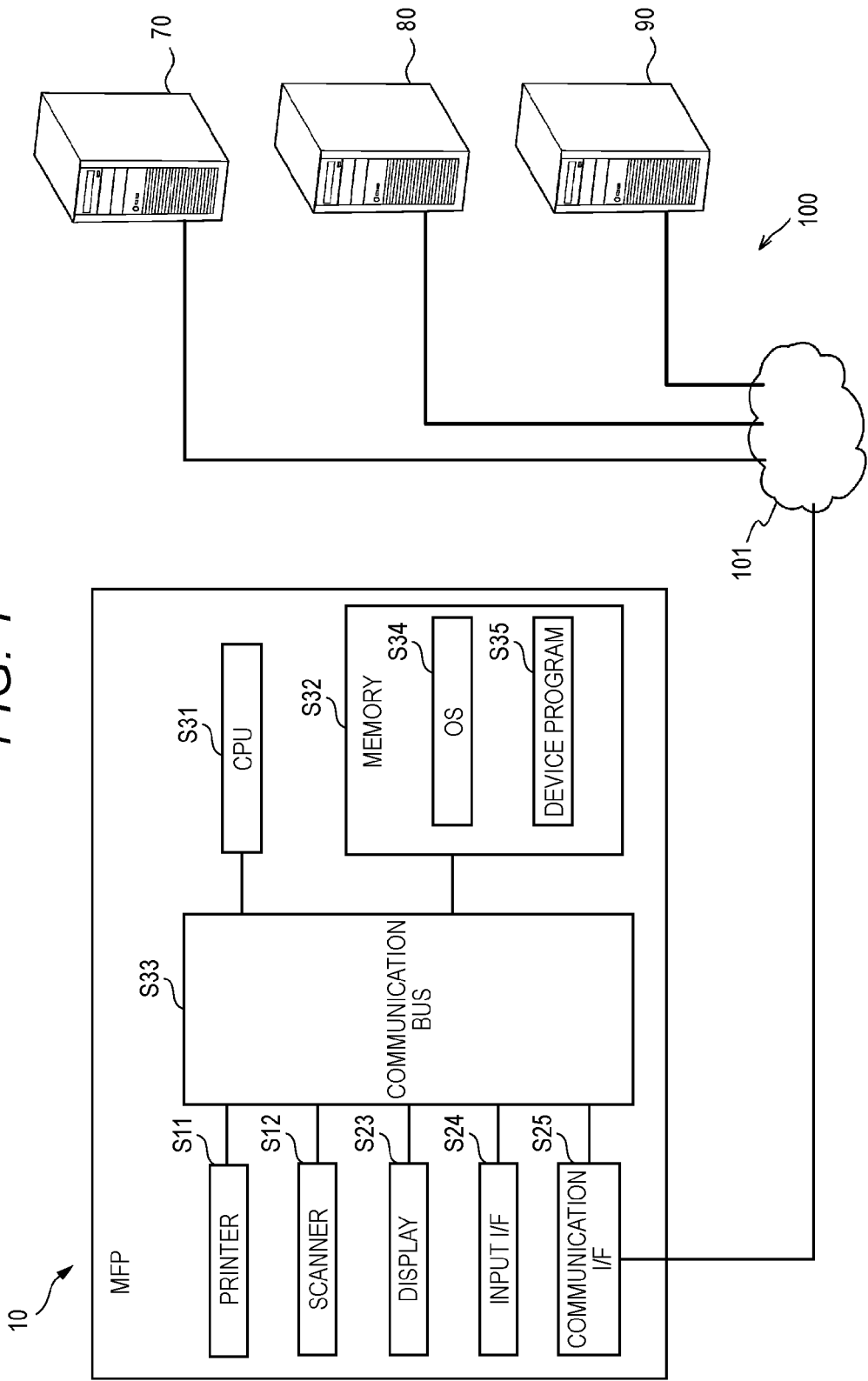

FIG. 2A

| DEVICE ITEM ID | DEVICE INFORMATION |
|---|---|
| MODEL NAME | MFP-A |
| SERIAL NUMBER | 123456789 |
| DATE | yy-MONTH zz-DAY, xxxx-YEAR |
| ... | ... |

FIG. 2B

| PROGRAM ID | ADDRESS INFORMATION |
|---|---|
| SCAN-UPLOAD | www.server-a.com/scan-upload1.xml |
| DOWNLOAD-PRINT | www.server-a.com/download-print1.xml |

FIG. 3A scan-upload1.xml

```
<SCREEN>
  <NEXT_URL> www.server-a.com/scan-upload2.xml </NEXT_URL>
  <TITLE> RESOLUTION SELECTION SCREEN </TITLE>
  <OPTION DISPLAY key = "RESOLUTION">
    <OPTION_val="1">300dpi</OPTION>
    <OPTION_val="2">600dpi</OPTION>
  </OPTION DISPLAY>
</SCREEN>
```

FIG. 3B scan-upload2.xml

```
<SCREEN>
  <NEXT_URL> www.server-a.com/scan-upload3.xml </NEXT_URL>
  <TITLE> TYPE SELECTION SCREEN </TITLE>
  <OPTION_DISPLAY key = "DOCUMENT_TYPE">
    <OPTION_val="1">ESTIMATE</OPTION>
    <OPTION_val="2">INVOICE</OPTION>
  </OPTION_DISPLAY>
</SCREEN>
```

FIG. 3C scan-upload3.xml

```
<COMMAND>
  <SCAN-UPLOAD>
    <RESOLUTION>2</RESOLUTION>
    <FORMAT>1</FORMAT>
    <SERVER>www.server-c.com</SERVER>
  </SCAN-UPLOAD>
  <TEMPLATE_PATH>www.server-b.com/template.xml</TEMPLATE_PATH>
</COMMAND>
```

FIG. 3D

LOG INFORMATION

```
<EVTPARAM>
  <RESOLUTION>2</RESOLUTION>
</EVTPARAM>

<EVTPARAM>
  <DOCUMENT_TYPE>1</DOCUMENT_TYPE>
</EVTPARAM>

<CMDPARAM>
  <RESOLUTION>2</RESOLUTION>
  <FORMAT>1</FORMAT>
  <SERVER>www.server-c.com</SERVER>
</CMDPARAM>

<EVTPARAM>
  <SCAN_RESULT>NORMAL COMPLETION</SCAN_RESULT>
  <PAGE_NUMBER>5</PAGE_NUMBER>
</EVTPARAM>
```

FIG. 4A template.xml

```
<METADATA>
  <DEVICE_INFORMATION>
    <MODEL_NAME>%%OIDPARAM("MODEL NAME")%%</MODEL_NAME>
  </DEVICE_INFORAMTION>
    <SCAN_DATE>%%OIDPARAM("DATE")%%</SCAN_DATE>
  <RESOLUTION>
    <SCRIPT>
      if %%EVTPARAM("RESOLUTION")%% = "1"
        "300dpi"
      else
        "600dpi"
      end
    </SCRIPT>
  </RESOLUTION>
  <DOCUMENT_TYPE>
    <SCRIPT>
      if %%EVTPARAM("DOCUMENT TYPE")%% = "1"
        "ESTIMATE"
      else
        "INVOICE"
      end
    </SCRIPT>
  </DOCUMENT_TYPE>
  <FILE_FORMAT>
    <SCRIPT>
      if %%CMDPARAM("FORMAT")%% = "1"
        "TIFF"
      else
        "PDF"
      end
    </SCRIPT>
  </FILE_FORMAT>
  <SCRIPT>
    if %%EVTPARAM("SCAN RESULT")%% = "NORMAL COMPLETION"
      "<PAGE_NUMBER>%%EVTPARAM("PAGE NUMBER")%%</PAGE_NUMBER>"
    end
  </SCRIPT>
</METADATA>
```

FIG. 4B

METADATA.xml

```
<METADATA>
  <DEVICE_INFORMATION>
    <MODEL_NAME>MFP-A</MODEL_NAME>
  </DEVICE_INFORMATION>
  <SCAN_DATE>APRIL 14, 2016</SCAN_DATE>
  <RESOLUTION>600dpi</RESOLUTION>
  <DOCUMENT_TYPE>ESTIMATE</DOCUMENT_TYPE>
  <FILE_FORMAT>TIFF</FILE_FORMAT>
  <PAGE_NUMBER>5</PAGE_NUMBER>
</METADATA>
```

IMAGE PROCESSING APPARATUS AND IMAGE PROCESSING SYSTEM CAPABLE OF GENERATING SCAN DATA AND METADATA

CROSS-REFERENCE TO RELATED APPLICATION

This application claims priority from Japanese Patent Application No. 2016-121515 filed on Jun. 20, 2016, the entire subject matter of which is incorporated herein by reference.

TECHNICAL FIELD

This disclosure relates to an image processing apparatus that uploads scan data generated by a scanning action and metadata of the scan data to a server.

BACKGROUND ART

For example, a background image processing apparatus uploads scan data generated by a scanning action and metadata of the scan data to a server. Specifically, the image processing apparatus causes a scanner to execute a scanning action and generates metadata including information defined in a template, for example. The metadata is used to classify the scan data, for example.

SUMMARY

In the background image processing apparatus, however, a user operation for inputting information to be included in metadata in advance is required separately from a user operation for instructing execution of a scanning action. That is, according to such image processing apparatus, the user has to make a complicated preparation in order to cause the image processing apparatus to execute various actions.

This disclosure is to provide an image processing apparatus capable of generating scan data and metadata without requiring complicated preparations by a user.

An image processing apparatus according to this disclosure includes: a scanner that executes a scanning action of reading an original document and generating scan data; a communication interface; a display; an input interface; a memory storing instructions; and a controller. When executing the instructions, the controller causes the image processing apparatus to execute: a first transmission processing of transmitting transmission request information to request for transmission of instruction data to a server through the communication interface; a first reception processing of receiving the instruction data, which is transmitted from the server in response to the transmission request information, from the server through the communication interface; a first determination processing of determining whether the instruction data received by the first reception processing is either one of screen instruction data and action instruction data. In response to the determination of the first determination processing that the instruction data is the screen instruction data, the controller causes the image processing apparatus to execute: a display processing of displaying a setting screen instructed by the screen instruction data on the display, the setting screen being a screen on which a parameter corresponding to a first setting item is designated by a user, an acceptance processing of accepting a user operation designating the parameter corresponding to the first setting item instructed by the screen instruction data, after displaying the setting screen on the display, through the input interface; a first storage processing of storing the parameter designated by the acceptance processing in the memory in association with the first setting item instructed by the screen instruction data; and the first transmission processing of transmitting the transmission request information to request for transmission of a next instruction data instructed by the screen instruction data to the server through the communication interface, the transmission request information including the parameter indicating an execution condition of the scanning action when the parameter is designated by the acceptance processing. In response to the determination of the first determination processing that the instruction data is the action instruction data, the controller causes the image processing apparatus to execute: a scan instruction processing of causing the scanner to execute the scanning action according to the parameter included in the action instruction data, wherein the action instruction data is data, which is generated by the sever, based on a parameter included in the transmission request information to request for transmission of a next instruction data; an acquisition processing of acquiring template data, the template data being information indicating the first setting item corresponding to the parameter to be included in metadata, a generation processing of generating the metadata, with using the parameter stored in the memory, in association with the first setting item represented by the template data acquired by the acquisition processing; and a second transmission processing of transmitting the scan data and the metadata to the server through the communication interface.

According to the above configuration, during the series of processings required to cause the scanner to execute the scanning action, information necessary for generation of the metadata is collected. As a result, it is possible to upload the scan data and the metadata without requiring complicated preparations for generation of the metadata by a user. The parameter designated by the acceptance processing is not limited to the information used as the execution condition of the scanning action, and may be information to be included in the metadata.

BRIEF DESCRIPTION OF THE DRAWINGS

The foregoing and additional features and characteristics of this disclosure will become more apparent from the following detailed descriptions considered with the reference to the accompanying drawings, wherein:

FIG. 1 is a schematic diagram illustrating an image processing system 100 according to an embodiment;

FIGS. 2A and 2B illustrate an example of information stored in a memory 32; FIG. 2A illustrates MIB, and FIG. 2B illustrates a program list;

FIGS. 3A to 3C respectively illustrate an example of instruction data stored in a server 70, and FIG. 3D illustrates an example of log information stored in the memory 32;

FIG. 4A illustrates template data stored in a server 80, and FIG. 4B illustrates metadata generated by a device program 35;

FIG. 8A illustrates a PG selection screen, and FIG. 8B illustrates a resolution selection screen.

DETAILED DESCRIPTION

Figure 5:
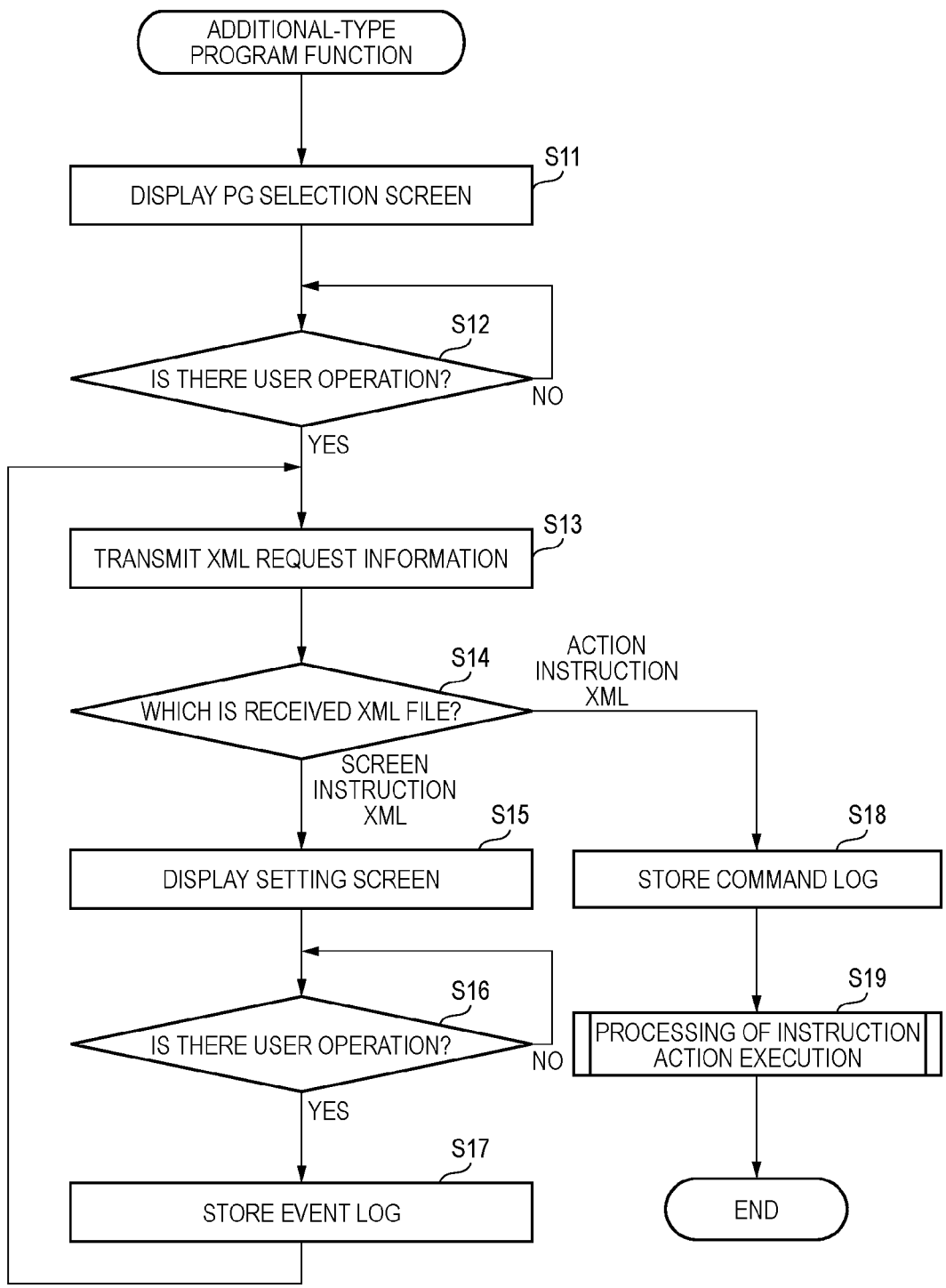
FIG. 5 is a flowchart of a processing related to an additional-type program function.

Hereinafter, embodiments of this disclosure will be described with reference to the accompanying drawings. The embodiments described below are merely examples of this disclosure. The embodiments of this disclosure can be appropriately changed within a range not changing the scope of this disclosure. For example, the execution order of each processing to be described later can be suitably changed within a range not changing the scope of this disclosure.

FIG. 1 is a schematic diagram of an image processing system 100 according to this embodiment. As illustrated in FIG. 1, the image processing system 100 includes an MFP (abbreviation for Multi Function Peripheral) 10 and servers 70, 80, and 90. The MFP 10 and the servers 70 to 90 are mutually communicable via a communication network 101. A specific example of the communication network 101 is not particularly limited, but may include, for example, Internet, a wired LAN, a wireless LAN, or a combination thereof.

As illustrated in FIG. 1, the MFP 10 mainly includes a printer 11, a scanner 12, a display 23, an input I/F 24, a communication I/F 25, a CPU 31, a memory 32, and a communication bus 33. The elements included in the MFP 10 are connected to each other through the communication bus 33. The MFP 10 is an example of an image processing apparatus.

The printer 11 executes a printing action of recording an image represented by image data on a sheet. As a recording method of the printer 11, a well-known method such as an inkjet method or an electrophotographic method can be employed. The scanner 12 executes a scanning action for generating scan data by reading an image recorded on an original document. The printer 11 may be omitted. That is, the image processing system 100 may be provided with a scanner single-function machine in place of the MFP 10.

The input I/F 24 is a user interface that receives an input operation from a user. Specifically, the input I/F 24 has buttons, and outputs various types of operation signals corresponding to a pushed button to the CPU 31. Further, the input I/F 24 may have a film-like touch sensor superimposed on a display screen of the display 23. An example of the user operation includes an operation of designating an object displayed on the display screen of the display 23 or an operation of inputting a character string or a digit string. The "object" may be, for example, a character string, an icon, a button, a link, or a pulldown menu displayed on the display 23.

The input I/F 24, which is realized as a touch sensor, outputs position information indicating a position on the display screen that the user touches. Incidentally, the "touch" in this description includes the general operation of bringing the input medium into contact with the display screen. Further, even if the input medium is not touching a display screen, "hover" or "floating touch" for bringing the input medium close to a position where the distance between the input medium and the display screen is very small may be included in the concept of "touch" described above. Further, the input medium may be a user's finger, a touch pen or the like. Hereinafter, a user operation for tapping the position of icons displayed on the display 23 is an example of a designation operation of designating the icons.

The communication I/F 25 is an example of a first communication interface for communicating with an external device through the communication network 101. That is, the MFP 10 transmits various types of information to the servers 70 to 90 through the communication I/F 25, and receives various types of data or various types of information from the servers 70 to 90 through the communication I/F 25. Specific communication procedure of the communication I/F 25 is not particularly limited, but, for example, Wi-Fi (registered trademark) may be employed.

The CPU 31 is to control the overall actions of the MFP 10. The CPU 31 acquires and executes various programs (to be described later) from the memory 32, for example, based on various types of signals output from the input I/F 24 and various types of information acquired from the external device through the communication I/F 25. That is, the CPU 31 and the memory 32 are an example of the first controller.

In the memory 32, an OS 34 and a device program 35 are stored. The device program 35 may be a single program or a group of a plurality of programs. In addition, the memory 32 stores data or information necessary for executing the device program 35. For example, the memory 32 is configured with a portable storage medium such as a USB memory detachably attached to a RAM, a ROM, an EEPROM, an HIT, or the MFP 10, a buffer provided in the CPU 31, or a combination thereof.

The memory 32 may be a storage medium readable by a computer. The storage medium readable by a computer is a non-transitory medium. Examples of the non-transitory medium also include recording media such as a CD-ROM and a DVD-ROM. The non-transitory medium is also a tangible medium. On the other hand, an electrical signal for carrying programs downloaded from, e.g., a server on the Internet is a signal medium readable by the computer as one kind of a medium readable by the computer, but is not included in a non-transitory storage medium readable by the computer.

The device program 35 includes a program for realizing an additional-type program function of the MFP 10. The additional-type program function is a function that the CPU 31 causes the MFP 10 to execute the action instructed by instruction data. Then, when a program record is registered in a program list to be described below, the device program 35 can cause the MFP 10 to execute the action instructed by the instruction data, by using the additional-type program function. Hereinafter, the instruction data used for the additional-type program function may be referred to as an "additional-type program".

As illustrated in FIG. 2A, for example, the memory 32 includes an MIB (abbreviation for Management Information Base). The MIB is an example of database information including a plurality of sets of device items IDs and device information. The MIB is, for example, a data structure conforming to SNMP (abbreviation for Simple Network Management Protocol). The device item ID is OID (abbreviation for Object IDentifier) that is represented by a combination of a plurality of numbers delimited by dots, for example, "0.1.3.6.1.2.1.1 . . . .". However, the device item ID is represented by a character string for easy understanding in this description.

The device item ID is an example of third identification information for identifying a device item (for example, "model name", "serial number", and "date information") indicating the type of device information. The device information is a value (for example, "MFP-A", "123456789", and "yy-month xx-day, xxxx-year") set uniquely to the MFP 10 with respect to the device item identified by the corresponding device item ID. The model name and the serial number are already stored in the memory 32 at the time of shipment of the MFP 10. The date information is obtained, for example, from an image processing system clock (not illustrated) as needed.

Further, for example, the memory 32 can store a program list as illustrated in FIG. 2B. The program list includes at least one program record. For example, the program record may already be registered at the time of shipment of the MFP10, or may be registered by a user through the input I/F 24 or the communication I/F 25.

The program record includes a program ID and address information corresponding to the program ID. The program ID is information for identifying the additional-type program function. The address information is information for indicating a location of the instruction data used for the additional-type program identified by the program ID. For example, the address information may be in an URL format including server identification information (for example, "www.server-a.com") for identifying the server 70 that stores the instruction data and file path information (for example, "scan-upload1.xml") for indicating a location path of the instruction data.

As an example, an additional-type program identified by a program ID "scan-upload" is instruction data that causes the MFP 10 to transmit the image data IC) generated by the scanning action of the scanner 12 to the server through the communication I/F 25. As another example, an additional-type program identified by a program ID "download-print" is instruction data that causes the MFP 10 to execute an action in which the printer 11 records the image represented by the image data received from the server through the communication I/F 25 on a sheet.

Although not illustrated, each of the servers 70 to 90 includes a server memory, a second communication I/F, and a second controller. The server memory may have the same configuration as the memory 32 of the MFP 10, the second communication I/F may have the same configuration as the communication I/F 25 of the MFP 10, and the second controller may have the same configuration as the first controller of the MFP 10. The server 70 is identified by the server identification information "www.server-a.com", the server 80 is identified by the server identification information "www.server-b.com", and the server 90 is identified by the server identification information "www.server-c.com". Each of the servers 70 to 90 may be configured with different types of hardware, or may be configured with a plurality of server programs that are operated on single hardware.

For example, the server 70 stores an XML file as illustrated in FIGS. 3A to 3C. The server 80 stores an XML file as illustrated in FIG. 4A, for example. In response to the request for transmission of the XML file from the MFP 10, the servers 70 and 80 transmit the requested XML file to the MFP 10. The server 90 is a so-called storage server. For example, the server 90 stores the scan data and the metadata transmitted from the MFP 10 in the server memory. Each of the servers 70 and 80 is, for example, a so-called Web server that transmits the XML file by MIR The XML files illustrated in FIGS. 3A to 3C are examples of text format instruction data used for the additional-type program function. The instruction data is roughly divided into screen instruction XML illustrated in FIGS. 3A and 3B and action instruction XML illustrated in FIG. 3C. The screen instruction XML is an example of screen instruction data that instructs the display 23 of the MFP 10 to display a setting screen. The action instruction XML is an example of action instruction data that instructs an action with using the scanner 12. However, the instruction data may be binary data or binarized text data, or may be a proprietary format designed for CSV format or additional-type program function.

The XML file illustrated in FIG. 4A is an example of template data (hereinafter, referred to as "template XML") of a text format. The template XML indicates contents of the metadata generated by the MFP 10 which executes the action instructed by the instruction data. More specifically, the template XML includes fixed information (for example, XML tag such as "<device_information>"), a reserved word (for example, "%%EVTPARAM (" . . . ")%%", "%%CMD-PARAM (" . . . ")%%", or "%%OIDPARAM (" . . . ")%%"), identification information (for example, "resolution", or "document type") associated with the reserved word, and a script. However, the template data may be binary data or binarized text data, or may be a proprietary format designed for CSV format or additional-type program function.

The fixed information is information to be included in the metadata. The reserved word is a control symbol indicating replacement of the reserved word itself with information stored in the memory 32. The identification information is information for identifying information to be replaced. The script is a program that converts parameters identified by the identification information into text. That is, the fixed information is included in both of the template data and the metadata. On the other hand, the reserved word, the identification information, and the script are included only in the template data, and are not included in the metadata. Further, a specific example of a script language is not particularly limited, but may be Lua, Ruby, JavaScript (registered trademark), for example.

Figure 6:
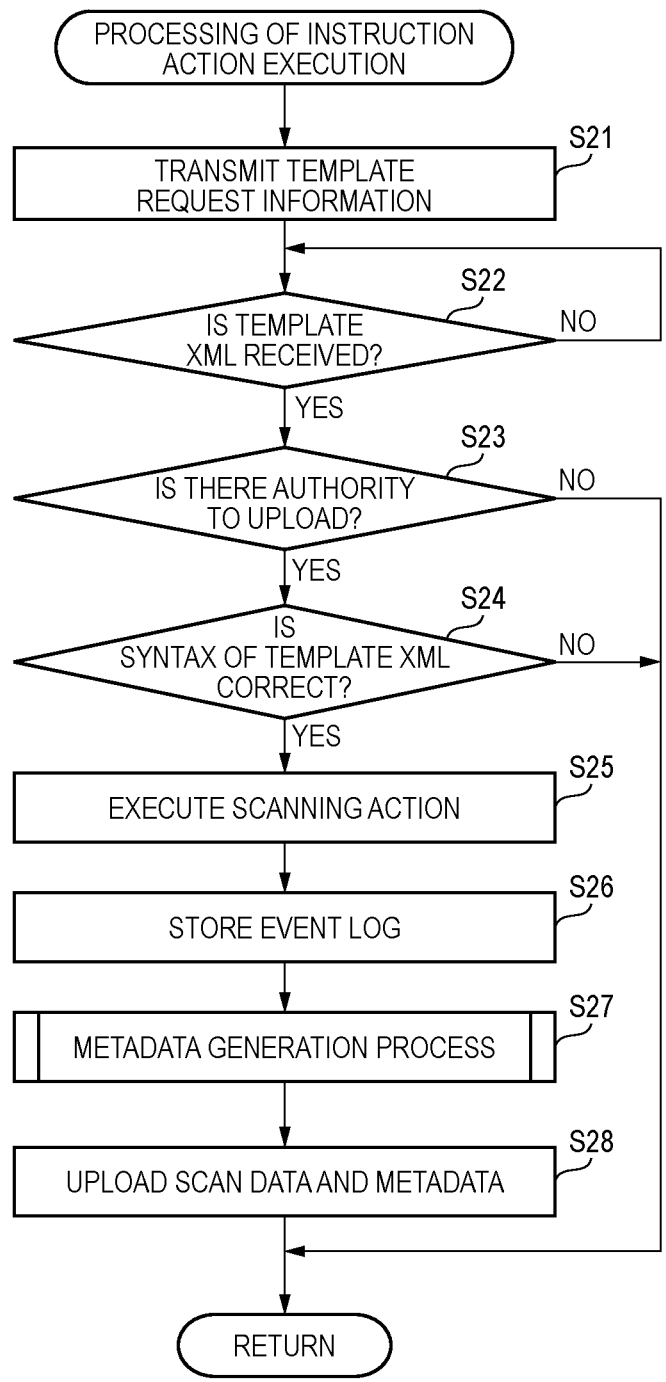
FIG. 6 is a flowchart of a processing of instruction action execution.
Figure 7:
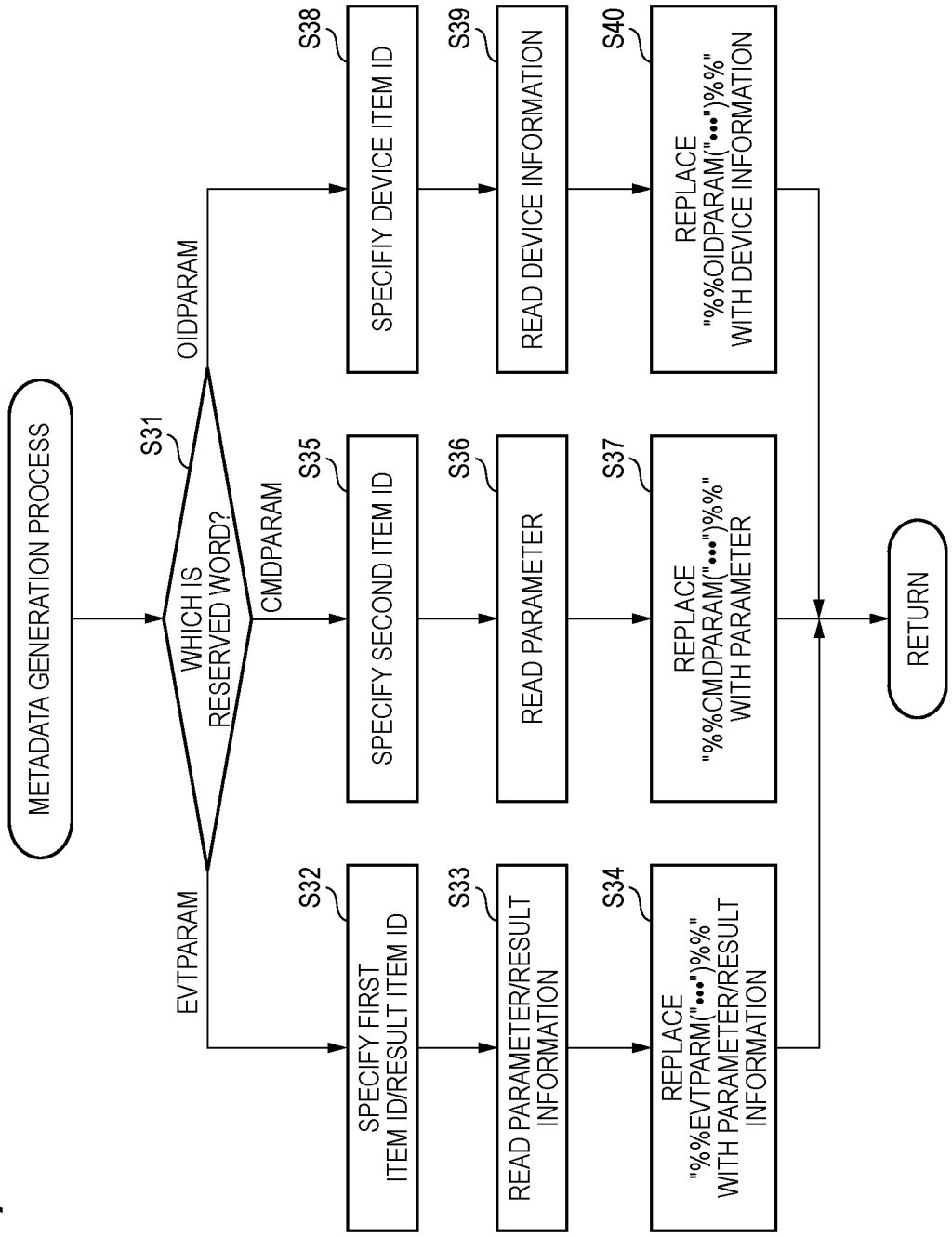
FIG. 7 is a flowchart of a metadata generation processing.

With reference to FIGS. 5 to 7, an action of the image processing system 100 according to this embodiment will be described.

In the following description, a flowchart basically indicates a processing of the CPU 31 according to the command described in the program. That is, the following description indicates that a processing such as "determining", "extracting", "selecting", "calculating", "deciding", "specifying", or "controlling" is performed by the CPU 31. Hardware control is also processed by the CPU 31 through the OS 34. Further, "data" in the following description indicates bit string readable by the computer. Then, it is assumed that data having substantially the same semantic contents and different formats are handled as the same data. The same applied to the "information" in the following description.

Additional-Type Program Function

The device program 35 can execute a processing related to the additional-type program function in response to an instruction from the user through the input OF 24. With reference to FIG. 5, the processing related to the additional-type program function will be described in detail.

Figure 8A:
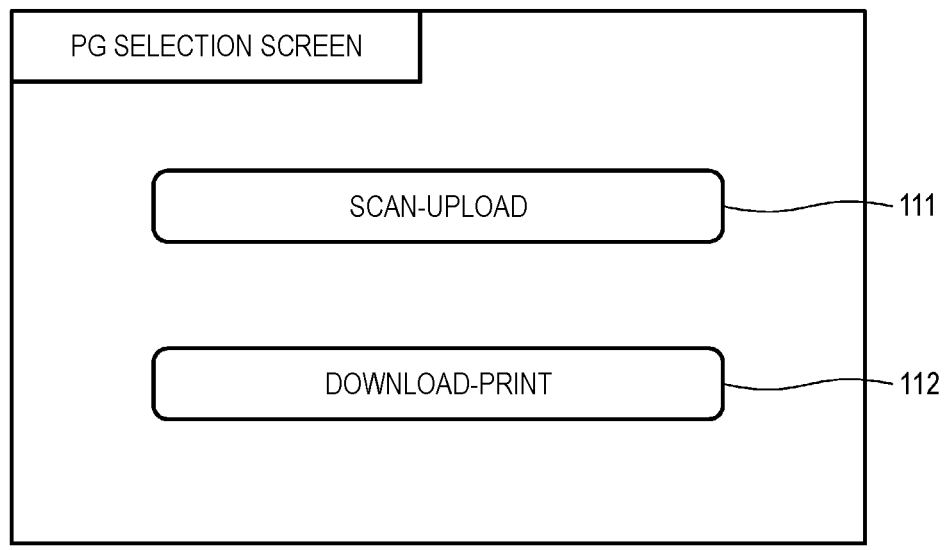
FIGS. 8A and 8B are display examples of a display 23.

First, the device program 35 causes the display 23 to display a PG selection screen illustrated in FIG. 8A (S11). The PG selection screen is a screen on which one of the plurality of additional-type programs registered in the MFP 10 is selected. The PG selection screen includes program icons 111 and 112. The program icons 111 and 112 correspond to one of the plurality of program records registered in the program list. Then, the device program 35 accepts a user operation on the PG selection screen through the input I/F 24 (S12).

In response to acceptance of designation of the program icon 111 through the input I/F 24 (S12: Yes), for example, the device program 35 executes the additional-type program function identified by the program ID "scan-upload". First, the device program 35 reads address information of a program record corresponding to the program icon 111 from the program list. Next, the device program 35 transmits XML request information for requesting transmission of the XML file represented by the file path information "scan-upload1.xml", to the server 70 identified by the server identification information "www.server-a.com", through the communication I/F 25 (S13). The XML request information is an example of transmission request information, and the processing of S13 is an example of a first transmission processing.

Although not illustrated, a second controller of the server 70 receives XML request information from the MFP 10 through a second communication I/F. This processing is an example of a second reception processing. Next, the second controller reads the XML file represented by the file path information "scan-upload1.xml" included in the XML request information from the server memory. Then, the second controller transmits the read XML file to the MFP 10 serving as a transmission source of the XML request information through the second communication I/F. This processing is an example of a third transmission processing.

Subsequently, the device program 35 receives the XML file illustrated in FIG. 3A from the server 70 through the communication I/F 25 as a response of the XML request information (S14). This processing is an example of a first reception processing. Then, the device program 35 determines whether the received XML file is any one of the screen instruction XML and the action instruction XML. This processing is an example of a first determination processing. More specifically, the device program 35 searches a <screen> tag and a <command> tag in the XML file. Then, the device program 35 determines in response to detection of the <screen> tag that the received XML file is the screen instruction XML (S14: screen instruction).

For example, as illustrated in FIG. 3A, the screen instruction XML includes a <Next_URL> tag, a <title> tag, a <option_display> tag, and a plurality of <option> tags as an element of the <screen> tag. In the element of the <Next_URL> tag, address information of instruction data to be acquired after executing the action instructed by the screen instruction XML is set. In the element of the <title> tag, a character string of a screen title of the setting screen is set. In an attribute "key" of the <option_display> tag, a first item ID (for example, "resolution") is set. The first item ID is an example of first identification information for identifying a first setting item corresponding to a parameter designated by a user through a setting screen instructed by the screen instruction XML. In the element of the <option> tag, text (for example, "300 dpi", "600 dpi") indicating the parameter to be designated by the user is set. In an attribute "val" of the <option> tag, a value (for example, "1", "2") of the parameter to be designated by the user is set.

Figure 8B:
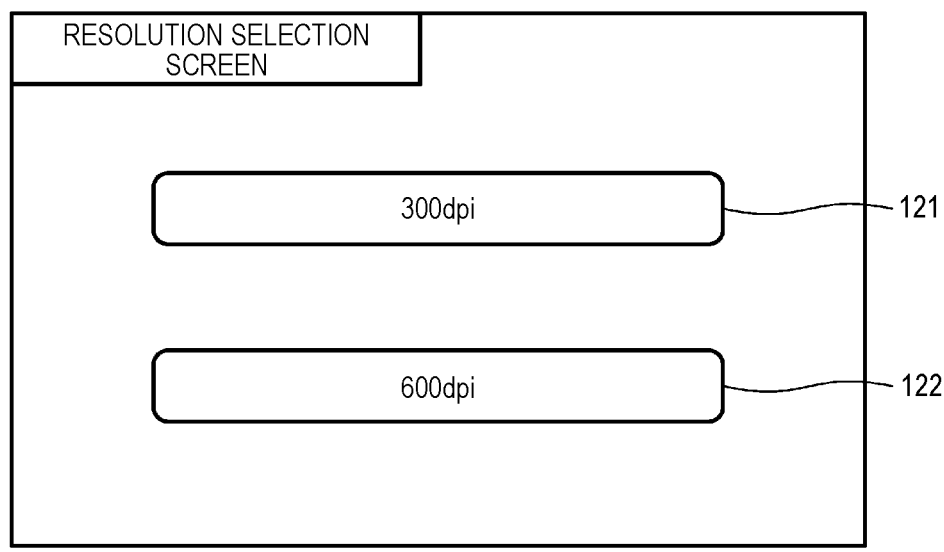

Next, in response to the determination that the received XML file is the screen instruction XML (S14: screen instruction), the device program 35 causes the display 23 to display a resolution selection screen illustrated in FIG. 8B according to the element of the <screen> tag (S15). The processing of S15 is an example of a display processing. The resolution selection screen is an example of a setting screen on which a parameter corresponding to a first setting item "resolution" is designated by the user. The resolution selection screen includes parameter icons 121 and 122 corresponding respectively to the plurality of <option> tags. In the parameter icons 121 and 122, text is described as an element of the corresponding <option> tag. The parameter of the first setting item "resolution" is a parameter indicating an execution condition of scan-upload.

Then, the device program 35 accepts a user operation for the resolution selection screen through the input I/F 24 (S16). The processing of S16 is an example of an acceptance processing of accepting a user operation designating a parameter after displaying the setting screen. In response to acceptance of designation of the parameter icon 122 through the input I/F 24 (S16: Yes), for example, the device program 35 causes the memory 32 to temporarily store an attribute value val="2" of the <option> tag associated with the parameter icon 122, as a parameter of the first setting item designated by the user. Herein, the parameter "2" to be temporarily stored may be binary data, for example.

Subsequently, the device program 35 causes the memory 32 to store a <resolution> tag indicating a first item ID "resolution" included in the screen instruction XML received in the immediately preceding step S14 and the parameter "2" designated in the immediately preceding step S16 in association with each other (S17). More specifically, as illustrated in FIG. 3D, the device program 35 causes the memory 32 to store the <resolution> tag and the parameter "2", which is an element of the <resolution> tag, as an element of an <EVTPARAM> tag. This processing of S17 is an example of a first storage processing.

Next, the device program 35 acquires an element "www.server-a.com/scan-upload2.xml" of <Next_URL> of the screen instruction XML received in the immediately preceding step S14, as address information of next instruction data. Subsequently, the device program 35 transmits XML request information for requesting transmission of an XML file represented by file path information "scan-upload2.xml" to the server 70 identified by the server identification information "www.server-a.com" through the communication I/F 25 (S13). The XML request information includes the parameter "2" which is temporarily stored in S17.

Figure 9:
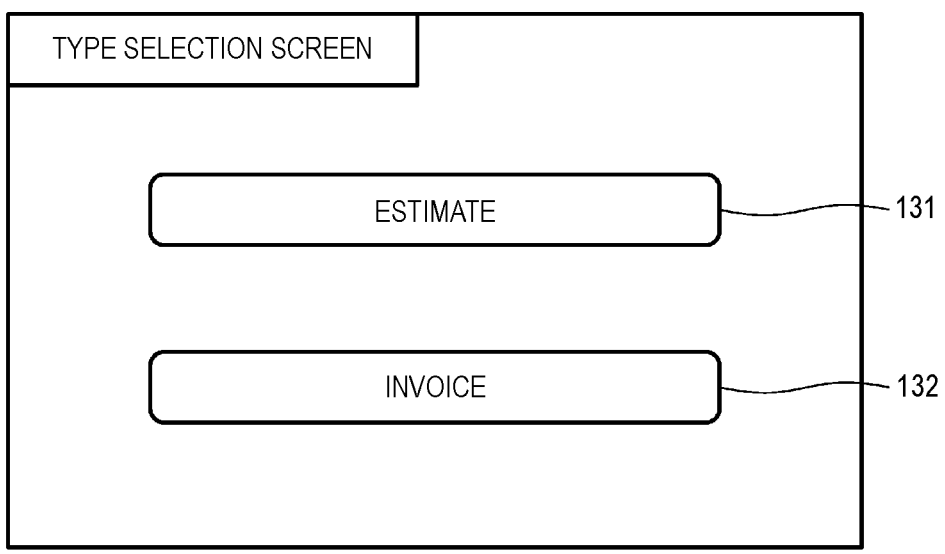
FIG. 9 illustrates a type selection screen displayed on the display 23.

Next, the device program 35 receives the screen instruction XML illustrated in FIG. 3B from the server 70 through the communication I/F 25 (S14: screen instruction). Subsequently, the device program 35 causes the display 23 to display a type selection screen illustrated in FIG. 9 according to the received screen instruction XML (S15). The type selection screen is an example of a setting screen on which a parameter corresponding to a first setting item "document type" is designated by the user. The type selection screen includes parameter icons 131 and 132 corresponding <option> tags. In the parameter icons 131 and 132, text is described as an element of the corresponding <option> tag. The parameter of the first setting item "document type" is a parameter to be designated by the user so as to be used for generation of metadata.

Then, the device program 35 accepts a user operation for the type selection screen from the input I/F 24 (S16). In response to acceptance of designation of the parameter icon 131 through the input I/F 24 (S16: Yes), for example, the device program 35 causes the memory 32 to temporarily store an attribute value val="1" of the <option> tag associated with the parameter icon 131, as a parameter of the first setting item designated by the user. Herein, the parameter "1" to be temporarily stored may be binary data, for example.

Subsequently, the device program 35 causes the memory 32 to store a <document_type> tag indicating the first item ID "document type" included in the screen instruction XML received in the immediately preceding step S14 and the parameter "1" designated in the immediately preceding step S16 in association with each other (S17). More specifically, as illustrated in FIG. 3D, the device program 35 causes the memory 32 to store the <document_type> tag and the parameter "1", which is an element of the <document_type> tag, as an element of an <EVTPARAM> tag.

That is, the device program 35 accepts the user operation for designating the plurality of parameters through the input I/F 54 in S16 to be executed at least once. That is, the device program 35 may execute the step S16, which accepts designation of one parameter, several times, or may accept designation of a plurality of parameters corresponding respectively to a plurality of first setting items at one time in S16. In S17 executed at least once, the device program 35 causes the memory 32 to store each of the plurality of parameters designated in S16 in association with the first item ID included in the screen instruction XML received immediately before S16.

Next, the device program 35 acquires an element "www.server-a.com/scan-upload3.xml" of the <Next_URL> tag in the screen instruction XML received in the immediately preceding step S14, as address information of next instruction data. Subsequently, the device program 35 transmits XML request information for requesting transmission of an XML file represented by file path information "scan-upload3.xml" to the server 70 identified by the server identification information "www.server-a.com" through the communication I/F 25 (S13). The XML request information includes the parameter "2" of the first setting item "resolution" and the parameter "1" of the first setting item "document type".

Next, the device program. 35 receives the XML file illustrated in FIG. 3C from the server 70 through the communication I/F 25. Subsequently, in response to detection of a <command> tag in the XML file illustrated in FIG. 3C, the device program 35 determines that the XML file is the action instruction XML (S14: action instruction). For example, as illustrated in FIG. 3C, the action instruction XML includes a <scan-upload> tag, a <resolution> tag, a <format> tag, a <server> tag, and a <template_path> tag, as an element of the <command> tag.

The <scan-upload> tag is information for identifying the scan-upload action to be executed by the MFP 10. The <resolution> tag, the <format> tag, and the <server> tag are elements of the <scan-upload> tag, and are examples of second identification information (hereinafter, referred to as "second item ID") for identifying the second setting item. Further, parameters corresponding to the second setting item are set in the elements of the <resolution> tag, the <format> tag, and the <server> tag. In the element of the <template_path> tag, address information indicating a location of template data is set.

In the element of the <resolution> tag, a parameter "2(=600 dpi)" indicating scan resolution of the scanning action is set. The element of the <resolution> tag is a parameter designated by the user through the resolution selection screen. In the element of the <format> tag, a parameter "1(=TIFF)" indicating a file format of the scan data generated by the scanning action is set. The element of the <format> tag is a parameter designated by an administrator of the server 70 from the plurality of parameters "1(=TIFF)" and "2(=PDF)". In the element of the <server> tag, server identification information "www.server-c.com" of the server 90, to which the scan data is uploaded, is set. The element of the <server> tag is a parameter designated by the administrator of the server 70.

As described above, the action instruction XML includes a plurality of sets of second item IDs and parameters. In the action instruction XML illustrated in FIG. 3C, the element of the <resolution> tag fluctuates depending on the user operation in S16. On the other hand, in the action instruction XML illustrated in FIG. 3C, fixed values are set in the elements of the <format> tag and the <server> tag, the fixed values not fluctuating depending on the user operation for the input I/F 24. Further, the <resolution> tag is used as the first item ID in log information stored in the memory 32 in S17 and is used as the second item ID in the action instruction XML illustrated in FIG. 3C. That is, the first setting item and the second setting item may include the same item.

Next, in response to determination that the received XML file is the action instruction XML (S14: action instruction), the device program 35 causes the memory 32 to store the <resolution> tag, the <format> tag, and the <server> tag included in the action instruction XML and the elements of the respective tags in association with each other (S18). More specifically, as illustrated in FIG. 3D, the device program 35 causes the memory 32 to store the element of the <scan-upload> tag in the action instruction XML as an element of a <CMDPARAM> tag. The processing of S18 is an example of a second storage processing.

Subsequently, the device program 35 executes a processing of instruction action execution (S19). The processing of instruction action execution is a processing of executing an action instructed from the action instruction XML with using the MFP 10, generating metadata of the action, and uploading the generated metadata to the server 90. With reference to FIG. 6, the processing of instruction action execution will be described in detail.

Processing of Instruction Action Execution

First, the device program 35 acquires the element of the <template_path> tag in the action instruction XML as address information of a template XML. Next, the device program 35 transmits template request information for requesting transmission of the template XML represented by file path information "template.xml" to the server 80 identified by the server identification information "www.server-b.com", through the communication I/F 25 (S21). Then, the device program 35 receives the template XML illustrated in FIG. 4A from the server 80 through the communication I/F 25 as a response of the template request information (S22). The processing of S21 is an example of a third transmission processing, the processing of S22 is an example of a second reception processing, and the processings of S21 and S22 are examples of acquisition processings.

Next, the device program 35 determines whether the MFP 10 has authority to upload the scan data to the server 90 (S23). For example, the device program 35 may determine whether authentication information is stored in the memory 32. Herein, the authentication information indicates that there is authority to upload the scan data to the server 90. Subsequently, in response to determination that the MFP has the authority to upload (S23: Yes), the device program 35 determines whether the syntax of the template XML received in S22 is correct (S24). For example, the device program 35 may determine whether the grammar of the reserved word is correct or whether the grammar of the script language included in the template XML is correct.

Next, in response to determination that the syntax of the template XML is correct (S24: Yes), the device program 35 causes the scanner 12 to execute the scanning action according to the parameters "2(=600 dpi)" and "1(=TIFF)", which are the elements of the <resolution> tag and the <format> tag, the scanning action being a part of the scan-upload action instructed by the <scan-upload> tag of the action instruction XML. That is, the scanner 12 reads an image recorded on the original document at scan resolution "600 dpi", generates scan data of a file format "TIFF", and temporarily stores the generated scan data in the memory 32. The processing of S25 is an example of a scan instruction processing.

Subsequently, the device program 35 causes the memory 32 to store a plurality of result item IDs (for example, <page_number> tag and <scan_result> tag) and a plurality of pieces of result information (for example, "5" and "normal completion") in association with each other (S26). More specifically, as illustrated in FIG. 3D, the device program 35 causes the memory 32 to store the <page_number> tag, the result information "5" which is an element of the <page_number> tag, the <scan_result> tag, and the result information "normal completion" which is an element of the <scan_result> tag, as an element of an <EVTPARAM> tag. In S25, the device program 35 acquires the above-described result information from the scanner 12. The processing of S26 is an example of a third storage processing.

The result item ID is an example of fourth identification information for identifying a result item indicating the type of result information. The result information is information indicating the execution result of the scanning action. That is, the element "5" of the <page_number> tag illustrated in FIG. 3D indicates that the number of original documents read from the scanning action is five. Further, the element "normal completion" of the <scan_result> tag illustrated in FIG. 3D indicates that the scanning action executed in S25 by the scanner 12 is normally completed. However, specific examples of the result information are not limited thereto.

Next, the device program 35 executes a metadata generation processing (S27). The metadata generation processing is a processing of generating metadata with using at least one of the parameter of the first setting item, the parameter of the second setting item, the device information, and the result information which are represented by the template XML received in S22. The processing of S27 is an example of a generation processing. With reference to FIG. 7, the metadata generation processing will be described in detail.

Metadata Generation Processing

First, the device program 35 searches a reserved word included in the template XML. Then, in response to detection of the reserved word, the device program 35 determines whether the detected reserved word is any one of a first reserved word "%%EVTPARAM(" . . . ")%%", a second reserved word "%%CMDPARAM(" . . . ")%%", a third reserved word "%%EVTPARAM(" . . . ")%%", and a fourth reserved word "%%OIDPARAM(" . . . ")%%" (S31). The processing of S31 is an example of a second determination processing, a third determination processing, a fourth determination processing, or a fifth determination processing. The first reserved word and the third reserved word according to the embodiment have the character string "%%EVT-PARAM(" . . . ")%%" in common and are distinguished by the associated identification information. However, different character strings may be adopted for the first reserved word and the third reserved word.

In response to detection of, for example, a fourth reserved word "%%OIDPARAM("model name")%%" (S31: OID-PARAM), the device program 35 specifies a device item ID "model name" associated with the detected fourth reserved word (S38). Next, the device program 35 reads device information "MFP-A", which is stored in the MIB in association with the specified device item ID "model name", from the memory 32 (S39). Then, the device program 35 replaces the fourth reserved word "%%OIDPARAM ("model name")%%" detected in S31 with the device information "MPP-A" read in S39 (S40). The processing of S38 is an example of a fourth specifying processing, the processing of S39 is an example of a fourth reading processing, and the processing of S40 is an example of a fourth replacing processing.

In response to detection of, for example, a fourth reserved word "%%OIDPARAM("date")%%" (S31: OIDPARAM), the device program 35 specifies a device item ID "date" associated with the detected fourth reserved word (S38), Next, the device program 35 reads device information "Apr. 14, 2016", which is stored in the MIB in association with the specified device item ID "date", from the memory 32 (S39). Then, the device program 35 replaces the fourth reserved word "%%OIDPARAM("date")%%" detected in S31 with the device information "Apr. 14, 2016" read in S39 (S40). In S40, the date information included in the metadata indicates an execution date of the scanning action, for example.

In response to detection of, for example, the first reserved word "%%EVTPARAM("resolution")%%" (S31: EVT-PARAM), the device program 35 specifies a first item ID "resolution" associated with the detected first reserved word (S32). Next, the device program 35 reads a parameter "2", which is stored in the memory 32 in association with the specified first item ID "resolution", from the memory 32 (S33). That is, the plurality of pieces of log information stored in the memory 32, the device program 35 reads the element "2" of the <resolution> tag, which is an element of the <EVTPARAM> tag, as a parameter from the memory 32.

Next, the device program 35 converts the read parameter "2" into the text "600 dpi" according to the script of the template XML. Then, the device program 35 replaces the first reserved word "%%EVTPARAM("resolution")%%" detected in S31 with the converted text "600 dpi" (S34). More specifically, the device program 35 replaces the <script> tag including the first reserved word "%%EVT-PARAM("resolution")%%" detected in S31 and the entire elements of the <script> tag, with the text "600 dpi". In this case, the processing of S32 is an example of a first specifying processing, the processing of S33 is an example of a first reading processing, and the processing of S34 is an example of a first replacing processing.

In response to detection of, for example, a first reserved word "%% EVTPARAM("document type")%%" (S31: EVTPARAM), the device program 35 specifies a first item ID "document type" associated with the detected first reserved word (S32). Next, among the plurality of pieces of log information stored in the memory 32, the device program 35 reads the element "1" of the <document_type> tag, which is an element of the <EVTPARAM> tag, as a parameter from the memory 32. Subsequently, the device program 35 converts the read parameter "1" into text "estimate" according to the script of the template XML. Then, the device program 35 replaces the <script> tag including the first reserved word "%%EVTPARAM("document type") %%" detected in S31 and the entire elements of the <script> tag, with the converted text "estimate" (S34).

In response to detection of, for example, a second reserved word "%%CMDPARAM("format")%%" (S31: CMDPARAM), the device program 35 specifies a second item ID "format" associated with the detected second reserved word (S35). Next, the device program 35 reads the parameter "1", which is stored in the memory 32 in association with the specified second item ID "format", from the memory 32 (S36). That is, among the plurality of pieces of log information stored in the memory 32, the device program 35 reads the element "1" of the <format> tag, which is an element of the <CMDPARAM> tag, as a parameter from the memory 32.

Next, the device program 35 converts the read parameter "1" into text "TNT" according to the script of the template XML. Then, the device program 35 replaces the <script> tag including the second reserved word "%%CMDPARAM ("format")%%" detected in S31 and the entire elements of the <script> tag, with the converted text "TIFF" (S37). The processing of S35 is an example of a second specifying processing, the processing of S36 is an example of a second reading processing, and the processing of S37 is an example of a second replacing processing.

Further, in response to detection of, for example, third reserved words "%%EVTPARAM("scan result")%%" and "%%EVTPARAM("page number")%%" (S31: EVT-PARAM), the device program 35 specifies result item IDs "scan result" and "page number" associated with the detected third reserved words (S32). Next, the device program 35 reads the parameters "normal completion" and "5", which are stored in the memory 32 in association with the specified result item IDs "scan result" and "page number", from the memory 32 (S33). That is, among the plurality of pieces of log information stored in the memory 32, the device program 35 reads the element "normal completion" of the <scan_result> tag, which is an element of the <EVT-PARAM> tag, and the element "5" of the <page_number> tag, as result information from the memory 32.

Next, the device program 35 determines, according to the script, whether the parameter of the result item ID "scan result" is the "normal completion". Then, in response to determination that the parameter of the result item ID "scan result" is the "normal completion" (S34), the device program 35 replaces the <script> tag including the third reserved word "%%EVTPARAM("page number")%%" detected in S31 and the entire elements of the <script> tag, with the result information "5" read in S33. On the other hand, in response to determination that the parameter of the result item ID "scan result" is not the "normal completion", the device program 35 deletes the <script> tag including the third reserved word "%%EVTPARAM("page number") %%" detected in S31 and the entire elements of the <script> tag. In this case, the processing of S32 is an example of a third specifying processing, the processing of S33 is an example of a third reading processing, and the processing of S34 is an example of a third replacing processing.

The device program 35 executes processings of S31 to S40 for all the reserved words included in the template XML received in S22, Thus, as illustrated in FIGS. 4A and 4B, the device program 35 generates the metadata including the fixed information, the parameter of the first setting item, the parameter of the second setting item, the result information, and the device information from the template XML including the fixed information, the reserved word, the identification information, and the script. Then, the device program 35 causes the memory 32 to temporarily store the generated metadata.

More specifically, the fourth reserved word, which is the element of the <model_name> tag, is replaced with the device information "MFP-A"; the fourth reserved word, which is the element of the <scan_date> tag, is replaced with the device information "Apr. 14, 2016"; the first reserved word, which is the element of the <resolution> tag, is replaced with the parameter "600 dpi" converted into the text; the first reserved word, which is the element of the <document_type> tag, is replaced with the parameter "estimate" converted into the text; the second reserved word, which is the element of the <file_format> tag, is replaced with the parameter "TIFF" converted into the text; and the third reserved word, which is the element of the <page_number> tag, is replaced with the result information "5".

Returning to FIG. 6, the device program 35 acquires the element of the <server> tag in the action instruction XML, as server identification information for identifying a server to which upload data is uploaded. Then, the device program 35 transmits the upload data to the server 90 identified by the acquired server identification information "www.server-c.com" through the communication UT; 25 (S28). The upload data includes, for example, the scan data temporarily stored in the memory 32 in S25, the metadata temporarily stored in the memory 32 in S27, and the authentication information stored in the memory 32. The processing of S28 is an example of a second transmission processing. The upload destinations of the scan data and the metadata may be the same or different. The upload destination of the metadata may be indicated by the action instruction XML or may be indicated by the template XML.

Although not illustrated, the second controller of the server 90 receives upload data from the MFP 10 through the second communication I/F. This processing is an example of a third reception processing. Next, the second controller determines whether authentication information included in the upload data is valid. More specifically, for example, the second controller may determine whether authentication information equal to the authentication information included in the upload data may be stored in the server memory or the term of validity of the authentication information stored in the server memory has expired. Then, in response to the determination that the authentication information is valid, the second controller stores the scan data and the metadata included in the upload data in the server memory. On the other hand, in response to the determination that the authentication information is invalid, the second controller transmits error information to the MFP 10 through the second communication I/F without storing the scan data and the metadata in the server memory.

Operational Effect of Embodiment

According to the above-described embodiment, during the series of processing required to cause the MFP 10 to execute the scan-upload action, information necessary for generation of metadata is collected. As a result, it is possible to upload the scan data and the metadata without requiring complicated preparations for generation of the metadata to the user. The parameter designated by the acceptance processing is not limited to the information (for example, resolution) used as the execution condition of the scanning action, and may be information (for example, document type) to be included in the metadata.

Further, according to the embodiment, the metadata can include not only the parameter of the first setting item designated by the user in the acceptance processing but also the parameter of the second setting item included in the action instruction XML, the device information, and the result information. Thus, more detailed metadata can be generated. However, the metadata may include at least a part of the above-described information without being limited to including all the above-described information.

Further, according to the embodiment, the fixed information of the template data is copied to the metadata, the first reserved word is replaced with the parameter of the first setting item, the second reserved word is replaced with the parameter of the second setting item, the third reserved word is replaced with the device information, and the fourth reserved word is replaced with the result information. This simplifies the processing of generating the metadata compared to the case where all the information included in the metadata is generated by the device program 35.

According to the embodiment, among the plurality of first setting items, the first setting item corresponding to the parameter included in the metadata is specified by the combination of the first reserved word and the first item ID. This may make it unnecessary to create the template data by separately using the reserved words unique to a large number of first setting items. In addition, it is not necessary to incorporate a configuration for determining the reserved words unique to a large number of first setting items in the MFP 10, Similarly, the second setting item is specified by the combination of the second reserved word and the second item ID, the device item is specified by the combination of the third reserved word and the device item ID, and the result item is specified by the combination of the fourth reserved word and the result item ID. Thus, it is possible to specify information to be included in the metadata with few reserved words.

According to the embodiment, the metadata can be generated according to the script included in the template data. As an example, the parameter of the binary format used at the time of transmission and reception of the instruction data is converted into the text represented by the script. Thus, it is possible to generate the metadata including the text format information which is easy to use for management of the scan data. As another example, whether to be included the parameter of the result item ID "page number" in the metadata is switched depending on the value of the parameter of the result item ID "scan result". In this case, the parameter of the result item ID "scan result" is an example of a first parameter, and the parameter of the result item ID "page number" is an example of a second parameter.

However, the specific processing content of the script included in the template data is not limited to the examples described above. In a script of another example, the second parameter may directly be included in the metadata when the first parameter is a first value, and the second parameter may be included in the metadata by being changed to another value when the second parameter is a second value. That is, the script included in the template data may show at least a condition and a value included in the metadata when the condition is satisfied.

The example of receiving the template XML from server 80 is described in the embodiment. However, an acquisition destination of the template XML is not limited to the server 80. As an example, the MFP 10 may be provided with a mounting portion to which potable storage medium such as a USB memory is detachably attached. Then, the device program 35 may acquire the template XML from the USB memory attached to the mounting portion. As another example, the template XML may be stored in the memory 32. Then, the device program 35 may read the template XML from the memory 32. As further another example, the template XML may be included in the action instruction XML. That is, the device program 35 may read the template XML from the action instruction XML received from the server 70.

In the example illustrated in FIGS. 3A to 3C, the <Next_URL> tag is included only in the screen instruction XML and is not included in the action instruction XML. However, the <Next_URL> tag may be included in the action instruction XML. That is, the MFP 10 may be further operated after the action instructed by the action instruction XML. The element of the <Next_URL> tag included in the action instruction XML may indicate the screen instruction XML, or may indicate the action instruction XML.

As an example, after the action instruction XML in FIG. 3C, the MFP 10 may further execute the scanning action according to the same or different execution parameters. As another example, after the action instruction XML in FIG. 3C, the printer 11 may further execute a printing action of recording the image indicating the result of the scan-upload on a sheet. As further another example, after the action instruction XML in FIG. 3C, the display 23 may display the screen indicating the result of the scan-upload.

In the embodiment described above, the example where the binary values (for example, "1" or "2") corresponding to the parameters (for example. "600 dpi", "TIFF", or "estimate") designated by the user are included in the action instruction XML and the log information is described. However, the action instruction XML and the log information may include the text format parameter such as "600 dpi", "TIFF", or "estimate". This improves readability of the action instruction XML and the log information. Further, since the script to convert the parameter into the text format from the binary format can be omitted, the template data becomes simple.

In the embodiment described above, all the parameters designated by the user according to the screen instruction XML are added to the XML request information and transmitted to the server 70. In the server 70, among the parameters added to the XML request information, the parameter (for example, resolution) indicating the execution condition of the scan-upload is included in the action instruction XML, and the parameter (for example, document type) not indicating the execution condition of the scan-upload is not included in the action instruction XML. However, the device program 35 may determine which parameter is included in the action instruction XML.

More specifically, among the parameters designated in the preceding step S16, the device program 35 may cause the parameter indicating the execution condition of the scan-upload action to be added to the XML request information, or may cause the parameter not indicating the execution condition of the scan-upload action not to be added to the XML request information. In the server 70, all the parameters added to the XML request information may be included in the action instruction XML. In S13 which is executed several times, the device program 35 may cause all the parameters designated in the preceding step S16 to be added to the XML request information, or may cause only the parameter designated in the immediately preceding step S16 to be added to the XML request information.

There has been described an example in which various programs stored in the memory 32 are executed by the CPU 31, whereby each processing to be executed by the controller of this disclosure is realized in the MFP 10 according to the embodiment. However, the configuration of the controller is not limited thereto, some or all of them may be realized by hardware such as an integrated circuit.

Further, this disclosure may be realized not only as the MFP 10 but also as a program of causing the MFP 10 to execute processings. The program may be provided by being recorded in a non-transitory recording medium. The non-transitory recording medium may include a CD-ROM, a DVD-ROM, and a memory mounted into the server which can be connected to the MFP 10 through the communication network 101. The program stored in the memory of the server may be distributed through a communication network 101 such as the Internet in the form of information or signal which represents the program.

What is claimed is:

1. An image processing apparatus comprising:
a scanner that executes a scanning action of reading an original document and generating scan data;
a communication interface;
a display;
an input interface;
a memory storing instructions; and
a controller, when executing the instructions, causing the image processing apparatus to execute:
a first transmission processing of transmitting transmission request information to request for transmission of instruction data, to a server through the communication interface;
a first reception processing of receiving the instruction data, which is transmitted from the server in response to the transmission request information, from the server through the communication interface;
a first determination processing of determining whether the instruction data received by the first reception processing is either one of screen instruction data and action instruction data;
wherein, in response to the determination of the first determination processing that the instruction data is the screen instruction data, the controller causes the image processing apparatus to execute:
 a display processing of displaying a setting screen instructed by the screen instruction data on the display, the setting screen being a screen on which a parameter corresponding to a first setting item is designated by a user,
 an acceptance processing of accepting a user operation designating the parameter corresponding to the first setting item instructed by the screen instruction data, after displaying the setting screen on the display, through the input interface;
 a first storage processing of storing the parameter designated by the acceptance processing in the memory in association with the first setting item instructed by the screen instruction data, when the parameter is designated by the acceptance processing; and
 the first transmission processing of transmitting the transmission request information to request for transmission of a next instruction data instructed by the screen instruction data, to the server through the communication interface, the transmission request information including the parameter indicating an execution condition of the scanning action, when the parameter is designated by the acceptance processing,
wherein, in response to the determination of the first determination processing that the instruction data is the action instruction data, the controller causes the image processing apparatus to execute:
 a scan instruction processing of causing the scanner to execute the scanning action according to the parameter included in the action instruction data, wherein the action instruction data is data, which is generated by the server, based on a parameter included in the transmission request information to request for transmission of a next instruction data;
 an acquisition processing of acquiring template data, the template data being information indicating the first setting item corresponding to the parameter to be included in metadata,
 a generation processing of generating the metadata, with using the parameter stored in the memory, in association with the first setting item represented by the template data acquired by the acquisition processing; and
 a second transmission processing of transmitting the scan data and the metadata to the server through the communication interface; and
wherein the template data is capable of including:
fixed information to be included in the metadata; and
a first reserved word indicating that the parameter corresponding to the first setting item is included in the metadata, and
wherein, in the generation processing, the controller executes:
a second determination processing of determining whether the template data includes the first reserved word;
a first reading processing of reading the parameter corresponding to the first setting item from the memory, in response to the determination of the second determination processing that the template data includes the first reserved word; and
a first replacing processing of replacing the first reserved word included in the template data with the parameter read by the first reading processing to generate the metadata including the fixed information and the parameter.

2. The image processing apparatus according to claim 1, wherein the template data includes, first identification information associated with the first reserved word, the first identification information being information for identifying one of a plurality of the first setting items,
wherein the screen instruction data includes the first identification information of the first setting item corresponding to the parameter to be designated by the user through the setting screen,
wherein in the acceptance processing that is to be executed at least once, the controller accepts the user operation designating the plurality of parameters through the input interface,
wherein in the first storage processing that is executed at least once, the controller causes the memory to store each of the plurality of parameters designated by the acceptance processing in association with the first identification information included in the screen instruction data received immediately before the acceptance processing,
wherein in the generation processing, the controller executes a first specifying processing of specifying the first identification information associated with the first reserved word, in response to the determination of the second determination processing that the template data includes the first reserved word, and
wherein in the first reading processing, the controller reads the parameter, which is stored in the memory, in association with the first identification information specified by the first specifying processing.

3. The image processing apparatus according to claim 1, wherein in response to the determination of the first determination processing that the instruction data is the action instruction data, the controller executes a second storage processing of storing the parameter, which is included in the action instruction data in the memory, in association with a second setting item represented by the action instruction data, and wherein in the generation processing, the controller generates the metadata by using the parameter stored in the memory, in association with the first setting item and the second setting item which are represented by the template data.

4. The image processing apparatus according to claim 3, wherein the template data is capable of including:

fixed information to be included in the metadata; and a second reserved word indicating that the parameter corresponding to the second setting item is included in the metadata, and wherein, in the generation processing, the controller executes:

a third determination processing of determining whether the template data includes the second reserved word;

a second reading processing of reading the parameter corresponding to the second setting item from the memory, in response to the determination of the third determination processing that the template data includes the second reserved word; and a second replacing processing of replacing the second reserved word included in the template data with the parameter read by the second reading processing to generate the metadata including the fixed information and the parameter.

5. The image processing apparatus according to claim 4, wherein the template data includes second identification information associated with the second reserved word, the second identification information being information for identifying one of the plurality of second setting items, wherein the action instruction data includes the plurality of pieces of second identification information and the plurality of parameters corresponding to the second setting items identified respectively by the plurality of pieces of second identification information, wherein, in the second storage processing, the controller causes the memory to store the plurality of pieces of second identification information and the plurality of parameters included in the action instruction data in association with each other, wherein, in the generation processing, the controller executes a second specifying processing of specifying the second identification information associated with the second reserved word in response to the determination of the third determination processing that the template data includes the second reserved word, and wherein in the second reading processing, the controller reads the parameter, which is stored in the memory, in association with the second identification information specified by the second specifying processing.

6. The image processing apparatus according to claim 1, wherein the memory includes database information that stores device information, which is unique to the image processing apparatus, in association with a device item indicating a type of the device information, wherein the template data is capable of including a third reserved word indicating that the device information corresponding to the device item is included in the metadata, wherein in the generation processing, the controller executes:

a fourth determination processing of determining whether the template data includes the third reserved word;

a third reading processing of reading the device information corresponding to the device item from the memory, in response to the determination of the fourth determination processing that the template data includes the third reserved word; and a third replacing processing of replacing the third reserved word included in the template data with the device information read by the third reading processing to generates the metadata including the fixed information, the parameter, and the device information.

7. The image processing apparatus according to claim 6, wherein the template data includes third identification information associated with the third reserved word, the third identification information being information for identifying one of the plurality of device items, wherein the database information includes the plurality of pieces of third identification information and the plurality of pieces of device information identified respectively by the plurality of pieces of third identification information, wherein in the generation processing, the controller executes a third specifying processing of specifying the third identification information associated with the third reserved word in response to the determination of the fourth determination processing that the template data includes the third reserved word, and wherein in the third reading processing, the controller reads the device information, which stored in the database information, in association with the third identification information specified by the third specifying processing, from the memory.

8. The image processing apparatus according claim 1, wherein the controller executes a third storage processing of storing result information indicating an execution result of the scanning action in the memory in association with a result item indicating a type of the result information, according to the execution of the scan instruction processing, wherein the template data is capable of including a fourth reserved word indicating that the result information corresponding to the result item is included in the metadata, wherein, in the generation processing, the controller executes:

a fifth determination processing of determining whether the template data includes the fourth reserved word;

a fourth reading processing of reading the result information corresponding to the result item from the memory in response to the determination of the fifth determination processing that the template data includes the fourth reserved word; and a fourth replacing processing of replacing the fourth reserved word included in the template data with the result information read by the fourth reading processing to generate the metadata including the fixed information, the parameter, and the result information.

9. The image processing apparatus according to claim 8, wherein the template data includes fourth identification information associated with the fourth reserved word, the fourth identification information being information for identifying one of the plurality of result items, wherein in the third storage processing, the controller causes the memory to store the plurality of pieces of fourth identification information and the plurality of pieces of result information corresponding to the result item identified respectively by the fourth identification information in association with each other, wherein in the generation processing, the controller executes a fourth specifying processing of specifying the fourth identification information associated with the fourth reserved word, in response to the determination of the fifth determination processing that the template data includes the fourth reserved word, and wherein in the fourth reading processing, the controller reads the result information, which is stored in the memory, in association with the fourth identification information specified by the fourth specifying processing.

10. The image processing apparatus according to claim 1, wherein the template data includes a script that converts the parameter into text, and wherein in the generation processing, the controller converts the parameter read from the memory into the text according to the script to generate the metadata including the fixed information and the converted text.

11. The image processing apparatus according to claim 1, wherein the template data includes a script that determines a value of a first parameter, and wherein according to the script in the generation processing, the controller sets the parameter to include a second parameter when the first parameter is a first value, and sets the parameter to is not includes the second parameter when the first parameter is a second value.

12. The image processing apparatus according to claim 1, wherein in the acquisition processing, the controller executes:

a third transmission processing of transmitting template request information for transmission request of the template data to the server through the communication interface; and a second reception processing of receiving the template data, which is transmitted by the server in response to the template request information, from the server through the communication interface, and wherein, in the generation processing, the controller generates the metadata according to the template data received by the second reception processing.

13. An image processing system comprising:
an image processing apparatus; and
one or more servers,
wherein the image processing apparatus includes:
a scanner that executes a scanning action of reading an original document and generating scan data;
a first communication interface;
a display;
an input interface;
a memory storing instructions; and
a first controller, when executing the instructions, causing the image processing apparatus to execute:
a first transmission processing of transmitting transmission request information to request for transmission of instruction data to a server through the first communication interface;
a first reception processing of receiving the instruction data, which is transmitted from the server in response to the transmission request information, from the server through the first communication interface;
a first determination processing of determining whether the instruction data received by the first reception processing is either one of screen instruction data and action instruction data;

wherein, in response to the determination of the first determination processing that the instruction data is the screen instruction data, the first controller causes the image processing apparatus to execute:

a display processing of displaying a setting screen instructed by the screen instruction data on the display, the setting screen being a screen on which a parameter corresponding to a first setting item is designated by a user, an acceptance processing of accepting a user operation designating the parameter corresponding to the first setting item instructed by the screen instruction data, after displaying the setting screen on the display, through the input interface;

a first storage processing of storing the parameter designated by the acceptance processing in the memory in association with the first setting item instructed by the screen instruction data; and the first transmission processing of transmitting the transmission request information to request for transmission of a next instruction data instructed by the screen instruction data to the server through the first communication interface, the transmission request information including the parameter indicating an execution condition of the scanning action when the parameter is designated by the acceptance processing, wherein, in response to the determination of the first determination processing that the instruction data is the action instruction data, the first controller causes the image processing apparatus to execute:

a scan instruction processing of causing the scanner to execute the scanning action according to the parameter included in the action instruction data, wherein the action instruction data is data, which is generated by the sever, based on a parameter included in the transmission request information to request for transmission of a next instruction data;

an acquisition processing of acquiring template data, the template data being information indicating the first setting item corresponding to the parameter to be included in metadata, a generation processing of generating the metadata, with using the parameter stored in the memory, in association with the first setting item represented by the template data acquired by the acquisition processing; and a second transmission processing of transmitting the scan data and the metadata to the server through the first communication interface, wherein the template data is capable of including:
fixed information to be included in the metadata; and
a first reserved word indicating that the parameter corresponding to the first setting item is included in the metadata, and wherein, in the generation processing, the controller executes:

a second determination processing of determining whether the template data includes the first reserved word;

a first reading processing of reading the parameter corresponding to the first setting item from the memory, in response to the determination of the second determination processing that the template data includes the first reserved word; and a first replacing processing of replacing the first reserved word included in the template data with the parameter read by the first reading processing to generate the metadata including the fixed information and the parameter; and wherein the server includes:

a second communication interface;

a second controller, and the second controller executes:

a second reception processing of receiving the transmission request information from the image processing apparatus through the second communication interface;

a third transmission processing of transmitting the instruction data represented by the transmission request information received by the second reception processing to the image processing apparatus through the second communication interface; and a third reception processing of receiving the scan data and the metadata from the image processing apparatus through the second communication interface.

14. An image processing apparatus comprising:

a scanner that executes a scanning action of reading an original document and generating scan data;

a communication interface;

a display;

an input interface;

a memory storing instructions; and a controller, when executing the instructions, causing the image processing apparatus to execute:

a first transmission processing of transmitting transmission request information to request for transmission of instruction data, to a server through the communication interface;

a first reception processing of receiving action instruction data, which is transmitted from the server in response to the transmission request information, from the server through the communication interface;

wherein, in response to the receiving the action instruction data, the controller causes the image processing apparatus to execute:

a scan instruction processing of causing the scanner to execute the scanning action according to the parameter included in the action instruction data, wherein the action instruction data is data, which is generated by the server, based on a parameter included in the transmission request information to request for transmission of a next instruction data;

an acquisition processing of acquiring template data, the template data being information indicating a first setting item corresponding to a parameter to be included in metadata, a generation processing of generating the metadata, with using the parameter to be included in the metadata stored in the memory, in association with the first setting item represented by the template data acquired by the acquisition processing; and a transmission processing of transmitting the scan data and the metadata to the server through the communication interface;

wherein the template data is capable of including:

fixed information to be included in the metadata; and a first reserved word indicating that the parameter corresponding to the first setting item is included in the metadata, and wherein, in the generation processing, the controller executes:

a determination processing of determining whether the template data includes the first reserved word;

a first reading processing of reading the parameter corresponding to the first setting item from the memory, in response to the determination of the determination processing that the template data includes the first reserved word; and a first replacing processing of replacing the first reserved word included in the template data with the parameter read by the first reading processing to generate the metadata including the fixed information and the parameter.

* * * * *